United States Patent [19]

Harper

[11] 4,370,351

[45] Jan. 25, 1983

[54] PROCESS FOR ENRICHING THE PROTEIN CONTENT OF FOOD AND FEEDSTUFF AND PRODUCTS THEREOF

[76] Inventor: James L. Harper, Rte. 2, Box 340-A, Ocilla, Ga. 31774

[21] Appl. No.: 161,487

[22] Filed: Jun. 20, 1980

Related U.S. Application Data

[63] Continuation of Ser. No. 938,045, Aug. 30, 1978, abandoned.

[51] Int. Cl.$^3$ ............................ A23L 1/00; C12N 1/14; A01G 1/04
[52] U.S. Cl. ............................................ 426/7; 426/49; 426/618; 426/656; 435/254; 435/804; 47/1.1
[58] Field of Search ...................... 426/44, 46, 48, 54, 426/49, 618, 623, 656; 435/254; 47/1.1

[56] References Cited

U.S. PATENT DOCUMENTS

| | | | |
|---|---|---|---|
| 1,593,977 | 7/1926 | Kohman et al. | 435/225 |
| 2,648,163 | 8/1953 | Szuecs | 47/1.1 |
| 2,850,841 | 9/1958 | Szuecs | 47/1.1 |

FOREIGN PATENT DOCUMENTS

| | | | |
|---|---|---|---|
| 2151326 | 4/1973 | Fed. Rep. of Germany | 47/1.1 |
| 2621876 | 12/1976 | Fed. Rep. of Germany | 435/254 |
| 2328409 | 5/1977 | France | 426/44 |

OTHER PUBLICATIONS

Kurtzman, Jr., "Solid State Fermentation of Lignin by Pleurotus Ostreatus", U.S. Dept. of Agr., Calif., 8/30/76, pp. 1-14.

"The Balance of Nitrogen & Composition of Proteins in *Pleurotus Ostreatus* Grown on Natural Substrates", by A. Ginterova et al., *Folia Microbiologica (Prague)*, vol. 20, pp. 246-250, (1975).

*Principles of Biochemistry*, 6th Edition by A. White et al., pp. 33-34, (McGraw-Hill Book Company, 1978).

*Primary Examiner*—Thomas G. Wiseman
*Assistant Examiner*—Elizabeth A. Hatcher
*Attorney, Agent, or Firm*—Bradford E. Kile

[57] ABSTRACT

The invention comprises a method for producing a protein enriched food or feed product and products thereof. The method entails forming a mixture of water and a food or feed product, sterilizing the mixture, innoculating the sterilized mixture with a spawn culture of the genus Pleurotus, maintaining the innoculated mixture in the presence of air at a temperature of from about 5° to about 46° C. so as to enable the mycelium of the spawn culture to grow, and later terminating the growth of the mycelium. The food or feed product resulting from this process has an increased protein content.

2 Claims, No Drawings

PROCESS FOR ENRICHING THE PROTEIN CONTENT OF FOOD AND FEEDSTUFF AND PRODUCTS THEREOF

This is a continuation of application Ser. No. 938,045, filed Aug. 30, 1978 now abandoned.

BACKGROUND OF THE INVENTION

This invention relates generally to food or feed products and processes. More particularly, this invention relates to a process for enhancing the protein content of food or feed products. Additionally the invention relates to food and feed products having an increased protein content as produced by the subject process.

One of the most serious problems which the world faces is supplying nutritionally adequate protein to meet the demands of a population which is expanding by approximately 55 million people annually. If the average protein requirement for an individual is about 52 pounds per year, this means that there must be produced an additional 2.8 billion pounds of protein each year just to keep pace with the population increase. This does not take into account the fact that much of the present world population does not have sufficient protein in their diet to be healthy enough to lead meaningful lives. Thus, there is a very pressing need for ways of increasing the total protein production of the world.

A problem associated with the need to supply adequate protein for the world population is the fact that cereal grains and cereal grain products make up a high percentage of the diet of most of the developing nations. Unfortunately, these grains and grain products usually contain 10% or less protein which is very often deficient in some of the essential amino acids. Since the average person requires at least 65 grams of high quality protein per day for good health, this means that an intake of 650 grams of cereal grains would be required to supply this quantity of protein. Ingesting this much cereal grain would supply too much carbohydrate relative to the amount of protein. Furthermore, the protein contained within these cereal grains is generally of relatively poor quality.

The present invention is directed to a solution to the above-described problems by increasing the ratio of protein to carbohydrate in cereal grains and products thereof while concomitantly improving the overall amino acid balance for the treated grain.

Much of the grain grown in the world is fed to monogastric animals (swine, chickens, etc.) who have roughly the same nutritional requirements as man. Accordingly, the present invention would lead to economy in feeding these animals since it would not be necessary to add protein supplements to these grains (soy bean meal, cotton seed meal, fish meal, etc.) if the animals were fed grains treated by the process of the present invention.

Studies have been made in the past to develope processes for treating various foods containing carbohydrates with lower fungi so as to increase their protein content. The process suggested in such studies, however, are less desirable than the process of the present invention because these other processes either require "fixed" inorganic nitrogen, or produce nutritionally deficient protein, or require separation of the protein to produce an acceptable food or feedstuff.

On the other hand, the present process suffers from none of these drawbacks. A food or foodstuff such as a cereal grain (wheat, corn, and the like) treated by the instant process may be dried to the customary moisture levels and processed by conventional methods to provide food and feed products such as bread, dry cereal products, dog and cat foods and the like which contain enough high quality protein to be nutritionally well balanced and have a flavor which is highly acceptable.

Additionally concepts have previously been disclosed relating to the art of cultivating mushrooms from a mycelium of the genus Pleurotus including *Pleurotus ostreatus, Pleurotus ulmariums, Pleurotus sapidus, Pleurotus cornucopiae,* and *Pleurotus florida.*

At least one publication suggests that mushrooms may be cultivated in a culture medium comprising, for example, corn fibers and rice bran (or corn bran) and subsequently the cultivation medium may be used as feedstuff.

At least one other previously known publication discloses that a nutrient substance which comprises one or more cellulose-containing agricultural waste products may be crushed, mixed with water and placed into a ventilated container which is sterilized. The sterilization is carried out either by heating to 70° to 80° C. for 5 hours or by introducing propylene oxide. After the mixture is placed inside the sterilized container, it is injected with a mycelium of the fungus *Pleurotus ostreatus*. The nutrient substance is preferably wheat, barley, rye, peas, rice shells, sun flower stalks and seeds.

The container is kept at a constant temperature between 16° and 20° C. after seeding. When the nutrient is permeated with the mycelium, the temperature is lowered to between 5° and 16° C. After the onset of the crop of mushrooms, the container is opened and illuminated with light.

Still another theorist suggests that a substrate such as seed oil residues (e.g., cottonseed meal, coconut meal, peanut meal, etc.) which are advantageously mixed with a cereal material such as wheat or the like may be innoculated with a mycelium of mushrooms including, among others, *Pleurotus ostreatus*. The substrate (e.g., peanut meal) is first acid hydrolyzed by treating it with mineral acid. The calcium carbonate is added and the pH is adjusted to between 6 and 8. This mixture is then innoculated with the mycelium of mushrooms (e.g., *Pleurotus ostreatus*) which has been grown on a medium of the same composition.

Although the above noted disclosures have at least a degree of conceptual appeal in the art of growing mushrooms, little if any attention has been directed to developing a protein enriched food or food stuff using a spawn culture of the genus Pleurotus. In none of these publications has any mention been made of the fact that Pleurotus will grow in the presence of materials already containing protein (cereal grain and the like) without substantially altering the protein already present, and at the same time produce additional protein by fixing nitrogen which is in the air and using the grain as a source of carbon.

OBJECTS AND SUMMARY OF THE INVENTION

Accordingly, a general object of the present invention is to provide a novel process for preparing a food or feed product which has an enhanced protein content.

A more specific object of the present invention is to provide a novel process for increasing the protein content of food or feed products.

Another object of the invention is to provide a novel process for increasing the protein content of a food or foodstuff utilizing nitrogen from the atmosphere.

A further object of the invention is to provide a novel process for increasing the protein content of cereal grains while concomitantly improving the overall amino acid balance for the treated grain.

A still further object of the invention is to provide a novel process for increasing the protein content of agricultural waste products to produce a product particularly suited for animal feedstuff.

Still another object of the present invention is to provide a protein enriched food or feed product produced by this process.

Other objects and advantages of the invention will become apparent from the following summary and description of the preferred embodiments of the present invention.

SUMMARY

In one aspect, the present invention provides a process for increasing the protein content of a food or feed product which contains carbohydrates.

This process comprises:

(a) forming a mixture of the food or feed product with water;

(b) sterilizing the mixture in order to substantially eliminate the growth of substances which would compete with a spawn culture of the genus Pleurotus;

(c) innoculating the mixture with a spawn culture of the genus Pleurotus;

(d) maintaining the innoculated mixture in the presence of air at a temperature of from about 5° C. to about 46° C. so as to enable the mycelium of the spawn culture to grow, and (e) terminating the reproduction of the mycelium so as to form a food or feed product which has an increased protein content.

In another aspect, the present invention comprises the product produced by the above described process.

DESCRIPTION OF PREFERRED EMBODIMENTS

The process of the present invention involves treating a food or feed product with a spawn culture of the genus Pleurotus. The food products useful in this process include any carbohydrate containing food product on which Pleurotus mycelium will grow in the presence of air. Such products include, for example, cereal grains such as corn, rye, oats, milo, rice, barley; soybeans, manioc, yams, and sweet potatoes; products of the milling industry that contain carbohydrates such as wheat bran and rice bran; other carbohydrate containing food products such as lima beans, pinto beans, and pulses including white acre peas, black-eyed peas, and the like; and agricultural wastes such as peanut hulls, corn residue, grain straws, cottonseed hulls, bigasse, corn silage. Mixtures of two or more food or feed products may also be used.

The first step in the subject process comprises mixing the food or feed product with water. Water is needed so that when the food or feed product is innoculated with Pleurotus it will have a sufficiently moist environment in which to grow.

The mixture should contain generally from about 20% to about 80%, typically from about 30% to about 70% and preferably from about 40% to about 60% by weight food or feed product, and correspondingly generally from about 20% to about 80%, typically from about 30% to about 70%, and preferably from about 40% to about 60% by weight water. These percentages are based upon the total weight of the mixture.

In a preferred embodiment of the present invention, calcium carbonate may be added to the mixture of the food product and the water. The purpose of the calcium carbonate is to increase the pH of the mixture to a value in the range of from about 6 to about 8 for the purpose of providing the preferred pH for the growth of Pleurotus. The calcium carbonate is also added for the purpose of supplying nutrient to the mixture.

Although calcium carbonate is preferred, any compound which is non-toxic and which will supply required nutrients is useful in the growth of the Pleurotus mycelium. Such compounds include calcium hydroxide, calcium sulfate, dicalcium phosphate, organic calcium salts such as calcium citrate, and the like, and other mineral nutrient materials such as nutrient compounds of potassium, magnesium, iron, phosphorus, zinc, copper, boron, sulfur, and the like. Mixtures of two or more nutrient compounds may also be used.

These nutrient compounds must be in a form such that they are not toxic to the mycelium. Harvested grains usually contain sufficient quantities of these nutrients and their addition is not required for efficient growth when harvested grains are employed.

The second step of the present process comprises sterilizing the mixture so as to substantially eliminate the growth of substances which might compete with the Pleurotus.

The mixture may be sterilized by any means known to those skilled in this art. For example, the mixture may be sterilized by heating or by pretreating the substrate with chemical compounds such as propylene oxide or anhydrous ammonia.

If the mixture is sterilized by means of heat, it should be heated to temperatures in excess of 120° C. for a sufficiently long period of time to allow the entire mixture to attain a minimum temperature of 120° C.

The sterilized mixture is next inoculated with a spawn culture of the genus Pleurotus at temperatures which are generally from about 5° C. to about 46° C. typically from 10° C. to about 30° C. and preferably from about 20° C. to about 30° C. Mixtures of two or more members of this genus may also be used.

As used herein, the term "spawn culture" refers to a living culture of the mycelium growing on any substrate which will support its growth.

The mixture may be inoculated with the spawn culture by adding a small amount of the culture as finely divided as possible and mixing this culture into the new substrate as thoroughly as possible. The amount of Pleurotus used to innoculate the food product-mixture may be generally from about 0.5% to about 20%; typically from about 1% to about 5%, and preferably from about 1% to about 3% by weight based upon the total weight of the innoculated mixture.

The innoculated mixture is then maintained in the presence of a mixture of nitrogen and oxygen at a temperature of generally from about 5° C. to about 46° C., typically from abut 10° C. to about 35° C., and preferably from about 20° C. to about 30° C. These temperature ranges are important in that they represent those temperatures at which Pleurotus will grow. At temperatures substantially below about 5° C. or substantially above about 46° C. Pleurotus does not experience substantial growth.

The innoculated mixture must be maintained in the presence of a mixture of nitrogen and oxygen in order to produce an increase in protein content of the food product.

Any ratio of nitrogen to oxygen may be employed in the process of the present invention although the mixture shall preferably contain more than 10% by weight oxygen and more than 10% by weight nitorgen. The amount of gas mixture which is employed is important only in that substantial protein increase may not occur if there is insufficient nitrogen and/or oxygen present during the growth period. Other gases may also be included in this mixture. Air which is at or near the surface of the earth is a preferred gas mixture since it contains oxygen and also contains approximately 78% molecular nitrogen by volume.

The innoculated mixture should be maintained in contact with the gas mixture for a period of time long enough to effect sufficient growth of the mycelium but not for too long a period of time since there is no advantage in doing so and since contamination with other fungi or bacteria may occur.

The innoculated mixture should be kept in contact with the gas mixture for generally from about 2 days to about 80 days, typically from about 14 days to about 56 days, and preferably from about 21 days to about 35 days.

If the innoculated mixture is kept in contact with the gas mixture for a time period substantially less than about 2 days, then the protein increase is comparatively insignificant. On the other hand, if the innoculated mixture is kept in contact with the gas mixture for a time period substantially in excess of 80 days, the amount of protein increase over and above that attained up until that time is also comparatively insignificant.

After sufficient mycelium growth has taken place, the growth of the mycelium is terminated. Growth may be terminated, for example, by dehydrating the mixture to a moisture content of generally less than about 20%, typically less than about 18%, and preferably less than about 12% by weight based upon the total weight of the innoculated mixture. Growth may also be terminated by chemical sterilization or heating.

Prior to treatment according to the process of the present invention, the food product has a protein content of generally less than about 25 percent, by weight, based upon the weight of the food product as determined by nitrogen analysis.

After treatment according to the process of the present invention, the food product has a protein content which is generally at least about 30 percent to 65 percent by weight higher; based upon the weight of the food product.

The following Examples are given as specific illustrations of the claimed invention. It should be understood, however, that the invention is not limited to the specific details set forth in the Examples. All parts and percentages in the Examples as well as in the remainder of the specification are by weight unless otherwise specified.

EXAMPLES 1-7

These Examples illustrate the preparation of the enriched protein food product of the present invention. The following general procedure applies to each of these Examples.

One hundred twenty five (125) grams of the food product, one hundred (100) grams of water, and two point five (2.5) grams of finely divided calcium carbonate are mixed in a glass container. The container is closed with a cotton plug and the mixture is sterilized by heating in a steam autoclave. The mixture is then cooled to room temperature and innoculated with a *Pleurotus ostreatus* spawn culture. The innoculated mixture is then maintained in the presence of atmospheric air at 21° C. The specific details of each Example are given in Table I below.

TABLE I

| Food Product | EXAMPLES | | | | | | |
|---|---|---|---|---|---|---|---|
| | 1 Corn | 2 Rye | 3 Oats | 4 Rice | 5 Wheat | 6 Wheat 50% Corn 50% By Weight | 7 White Acre Peas |
| Amount P.O. (grams) | 2.0 | 2.0 | 2.0 | 2.0 | 2.0 | 2.0 | 2.0 |
| Initial Protein Content | 11.3 | 14.3 | 14.0 | 8.0 | 15.5 | 12.8 | 22.5 |
| Protein Content After 3 weeks | 15.7 | 17.74 | 18.8 | 8.7 | — | — | — |
| Protein Content After 4 Weeks | — | — | — | — | 19.2 | 18.9 | 32.5 |
| Protein Content After 5 Weeks | — | 23.9 | — | 10.8 | — | — | — |

The protein content of each example was determined by the well known technique of nitrogen analysis.

The above examples illustrate that the present invention provides a process whereby protein content of a food product is substantially increased by innoculating the food product with mycelium of the genus Pleurotus. By means of this process, the ratio of protein to carbohydrate in cereal grains and other food products may be increased, thus alleviating to some degree the problems associated with the lack of protein in the diet of much of the world population.

COMPARATIVE EXAMPLE

Example 2 was repeated except that *Agaricus bisporus* mycelium was used instead of *Pleurotus ostreatus*. Substantially no increase in protein content was measured.

The above-described Examples illustrate that when the process of the present invention is employed, there is produced a food product having an increased protein content. On the other hand, when the same process is carried out using *Agaricus Bisporius* rather than Pleurotus, there results substantially no protein increase.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

What is claimed is:

1. A process for increasing the protein content and improving the overall amino acid balance of a cereal grain which contains carbohydrates, without substantially altering the protein present in the cereal grain, by fixing nitrogen from a gaseous mixture containing molecular nitrogen comprising the steps of:
(a) forming a mixture of from about 40% to about 60% by weight cereal grain and from about 40% to about 60% by weight water;
(b) sterilizing said mixture in order to substantially eliminate the growth of substances which might compete with the growth of a spawn culture of the genus Pleurotus;
(c) inoculating said mixture with from about 1% to about 5% by weight of at least one member selected from the group consisting of *Pleurotus ostreatus, Pleurotus ulmarius, Pleurotus sapidus, Pleurotus cornucopiae,* and *Pleurotus florida;*
(d) maintaining the inoculated mixture in the presence of a mixture of a gaseous mixture of molecular nitrogen and oxygen at a temperature of from about 10° C. to about 46° C. for from about 21 to about 35 days so as to enable the mycelium of said spawn culture of the genus Pleurotus to reproduce; and
(e) recovering from the inoculated mixture as a food product the cereal grain with an increased protein content and improved amino acid balance without substantial alteration of the protein initially present.

2. A cereal grain food product produced by the process of claim 1.

* * * * *